United States Patent [19]

Akerberg

[11] Patent Number: 4,764,928
[45] Date of Patent: Aug. 16, 1988

[54] METHOD AND APPARATUS IN RADIO RECEPTION FOR AVOIDING STORING A MESSAGE MORE THAN ONCE

[75] Inventor: Dag E. Akerberg, Järfälla, Sweden

[73] Assignee: Telefonaktiebolaget LM Ericsson, Stockholm, Sweden

[21] Appl. No.: 885,578

[22] PCT Filed: Nov. 18, 1985

[86] PCT No.: PCT/SE85/00518
§ 371 Date: Jun. 30, 1986
§ 102(e) Date: Jun. 30, 1986

[87] PCT Pub. No.: WO86/03318
PCT Pub. Date: Jun. 5, 1986

[30] Foreign Application Priority Data

Nov. 26, 1984 [SE] Sweden ............................... 8405959

[51] Int. Cl.$^4$ ............................................. G06F 11/08
[52] U.S. Cl. ........................................ 371/69; 371/53; 371/67
[58] Field of Search .................... 371/69, 22, 31, 53, 371/57, 67; 455/38, 32; 340/825.44

[56] References Cited

U.S. PATENT DOCUMENTS 4,653,055 3/1987 Micic ..................................... 371/69

Primary Examiner—Jerry Smith
Assistant Examiner—Robert W. Beausoliel
Attorney, Agent, or Firm—Roberts, Spiecens & Cohen

[57] ABSTRACT

In a method of establishing, in the reception of messages in the form of characters sent by radio, particularly messages to personnel locators, that the latest of the received messages is identical with a previously received and stored message, there is included identifying the message with guidance from an identity code transmitted in the message. The code is either a part, i.e. a so-called block of the message or a character combination in the message. There is further included giving particular treatment to a received message with the same identity code as one already stored such as ignoring it. A receiver for carrying out the method includes a receiver aerial, a radio part, a demodulator, a decoder for the address of the receiver, a signal processor which in turn contains a register for a message, a message memory for more than one message and a comparator for comparing an identity code in the message in the register with the identity codes in the messages in the message memory and, on agreement for storing information thereon.

8 Claims, 2 Drawing Sheets

METHOD AND APPARATUS IN RADIO RECEPTION FOR AVOIDING STORING A MESSAGE MORE THAN ONCE

FIELD OF THE INVENTION

The invention relates to apparatus and methods for receiving messages sent by radio.

BACKGROUND

In the field with which the invention is concerned, the transmission of messages is one-way and, from the receiver side, it is impossible to affect transmission from the transmitter and to request and obtain the repetition of messages. The present state of the art with respect to radio reception and receivers, particularly with regard to receivers for personnel location, is described inter alia in Patent Application GB No. 2,101,779A, published in January 1983, as a personnel locator adapted for receiving calls sent by radio and for receiving and storing a plurality of messages and for presenting one message at a time in a display window. The received message is compared with each of the already stored messages and is stored in the receiver's memory only if it differs from all the messages already stored. A further case where repeated messages may be received is when the receiver is in a boundary area where the reception area associated with two time-displaced radio transmitters situated adjacent each other overlap each other; the same message can then be received first from one transmitter and then from the second transmitter.

With the intention that the probability of a message's being correctly received should be increased, the message is sent repeatedly, according to the above-mentioned British Patent Application, but the mentioned comparison prevents its being stored more than once. A weakness in the thus described personnel locator is that if a character in one of the received messages has been received in a distorted condition, the comparison cannot show that the same message has been received, and different versions of the same message will be stored twice and possibly several times.

There is further described an example of a method for transmitting and receiving personnel location calls in "Final Report of the British Post Office Code Standardisation Advisory Group (POCSAG)", London, 1978.

SUMMARY OF THE INVENTION

According to the invention, a reception method is characterized by the additional procedural steps of identifying the message with guidance from an identity code transmitted in it. The identity code may be of any kind at all and may, for example, be a part of the message itself, the format of the identity code being free from any controlling rule. Since the probability of a small part of a message being error-free is greater than the probability of an entire message being error-free, the reliability in the identification of two like messages will be greater in the method in accordance with the invention than with previously known methods. The identification is utilized to give a received message with the same identity code as one that is already stored a particular treatment which may consist of ignoring it.

The invention may employ different types of identity codes, such as a character combination inserted in an introductory block in the message. The method is applicable whether the associated receiver is adapted for storing a plurality of different messages or only one message.

When storing the characters of the message in blocks is included in the method of reception, it is part of the inventive identification to compare a selected number of blocks, which is less than all the blocks of the message and at least one block, from the last received message with corresponding blocks from the message or messages already received. Included in a development of the method is the investigation, on the basis of check characters inserted in each block, of whether the block contains any incorrectly received character and, if this is the case, storing an error indication in the message memory together with the block and restricting the comparison to error-free blocks. Messages to be received in the receiver may begin with the address code of the receiver. The receiver is adapted solely to receive messages each respectively containing its own address code.

A receiver for carrying out the method in accordance with the invention is equipped, inter alia, with a message memory having a capacity for more than one message, a register for storing the latest received message, and a comparator adapted for comparing an identity code in the message in the register with the identity codes in the messages in the message memory. Where there is agreement, the apparatus operates to store information thereon and to give the message in the register a particular treatment, e.g. preventing its being stored in the message memory of the message in the register. In a development of the invention, where the message memory and register are adapted for storing the messages in blocks, there is also arranged a control logic for comparing, in coaction with the comparator, a selected number of blocks from the register with corresponding blocks from the message or messages stored in the message memory; the selected blocks here constituting the identity code. In a still further development, there is included an error detector connected to the receiver decoder, the detector being adapted for establishing errors in the characters of the block on the basis of check characters included in the block, the register and message memory then being adapted, together with the block, as well as the control logic and comparator being adapted to confine the comparison to error-free blocks.

In another development of the inventive receiver, there is included in it an ID register adapted for storing an identity code in the form of a character combination from an introductory block in each of the messages stored in the register and in the message memory. The control logic included in the receiver is adapted to control, on the basis of the identity codes, the writing in of new messages in the message memory, and to prevent writing in duplicate messages.

BRIEF DESCRIPTION OF DRAWINGS

In the following description, there are presented examples of a method and an apparatus provided in accordance with the invention, with reference being made to the accompanying drawing in which.

DETAILED DESCRIPTION

Figure 1:
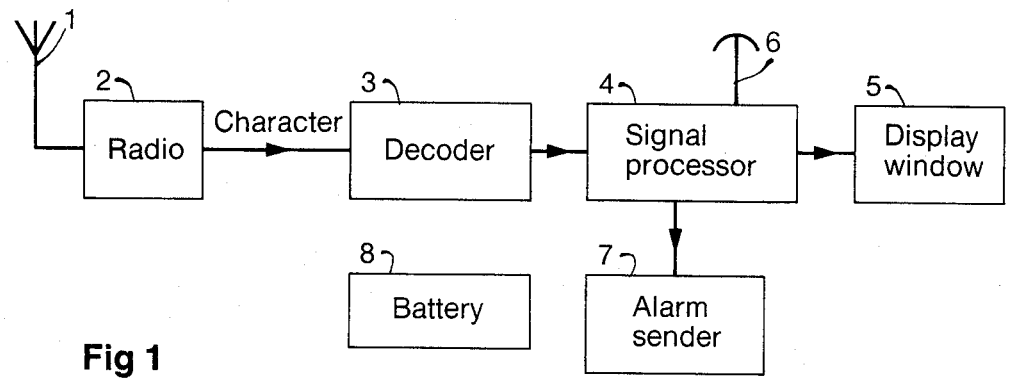
FIG. 1 is a block diagram of the main parts of a receiver.

In the method of the invention for receiving messages sent by radio, there is included receiving the radio transmission and detecting characters included in it. Particularly when personnel locator messages are intended to be received in the receiver, the message begins with the address code of the receiver, the receiver being adapted solely to receive messages containing its own address code. The method includes storing the received message in a memory, sending a signal, acoustic or otherwise, when a message has been stored, and presenting the latest received message in a display window on the receiver, as well as selecting, by depressing an operating button, any other of the stored messages which are to be presented in the display window.

Included in the method in accordance with the invention is, instead of comparing entire messages with each other, which is laborious and has the deficiencies mentioned above, to identify the message with guidance from an identity code transmitted in it. The identification is utilized to give the latest received message a particular treatment if it has the same identity code as an already stored message, e.g. ignoring this message. An alternative particular treatment is to send an alarm signal for the repeated message, but to refrain from storing it.

The identity code for a message can be selected in several different ways. One way is to select a small portion, e.g. at the beginning of the message, as the identity code and to compare these portions of the respective messages with each other. It may also be the case that the messages are divided into blocks and that they are stored in blocks. The method then includes selecting a small number of blocks from each of the messages for comparison.

A development of the method includes investigating, on the basis of check characters inserted in each of the blocks, whether the block contains any incorrectly received character and, if this is the case, storing an error indication together with the block and confining the comparison to error-free blocks.

The division into blocks and error control makes it possible to select for continued storage the one of the messages containing the greatest number of error-free blocks, if the comparison shows that the last received message has a counterpart among the already stored messages.

An alternative development of the method of the invention includes reading the identity code in the form of a character combination inserted in an introductory block in the message. This method can be further developed such that control characters are inserted in the introductory block with the identity code, for enabling an error check or even correction of an incorrectly transmitted identity code. It may be suitable to transmit the identity code in more than one block in the message to further increase reliability.

The method for receiving the message is primarily applicable to the reception of messages in a personnel locator, but can also be used in other receivers for one-way communication, where it is not possible to affect from the receiver the transmission of the message by the transmitter.

In the receiver for carrying out the method in accordance with the invention there are included, as illustrated in FIG. 1, a reception aerial 1, a radio reception part 2 connected to the aerial, with inter alia a demodulator for feeding out the characters of the message, a decoder 3 attached to the radio part, and adapted for, inter alia, reading the characters giving the address of the receiver and opening remaining circuits for reception when the device's own address has been received. There is further included a signal processor 4 for controlling presentation of the received message in an associated display window, 5. For reproducing a desired message in the display window there is a pushbutton 6 connected to the signal processor. For stating that a new message is available for showing, there is further included an acoustic-type alarm sender 7 connected to the signal processor, although another type, e.g. a vibrator or a lamp, may be used in alternative recievers. A battery 8 for current supply to the different electrical circuits of the receiver is included therein.

Figure 2:
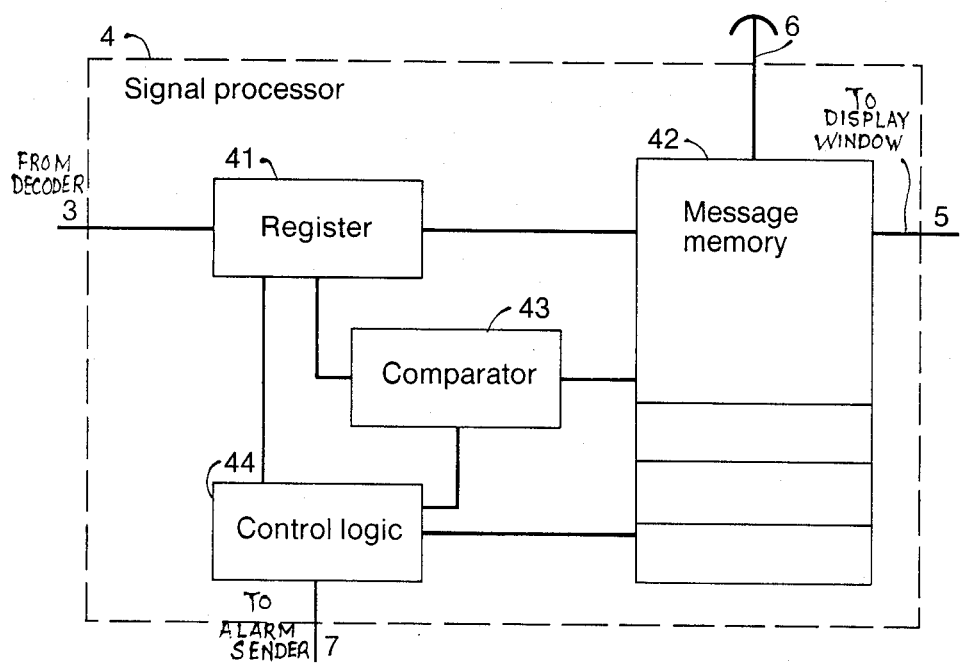
FIG. 2 is a block diagram of a signal processor included in the receiver in accordance with the invention.

The signal processor 4 may be regarded as the heart of the receiver, and it is therefore described in more detail below in connection with FIG. 2.

The signal processor 4 includes a register 41, adapted to receive characters in the message from the decoder 3 and to store them temporarily. The register is adapted for temporarily storing a single message.

A message memory 42 is adapted to store a plurality of received messages. The message memory is adapted such that when a new message is to be stored and the message memory is full, the first-stored message will be erased. The message memory 42 is adapted to feed out an optional message for presentation in the display window 5 on operation of the button 6.

A comparator 43 and control logic 44 are connected to the register 41 and the message memory 42 and are adapted such that together they control the comparison of the identity codes of the message in the register 41 and of the message in the message memory 42 as well as the transfer of the message from the register to the message memory in the cases where this transfer is to be permitted. The control logic 44 is also adapted to control sending an alarm signal from the alarm sender 7.

Figure 3:
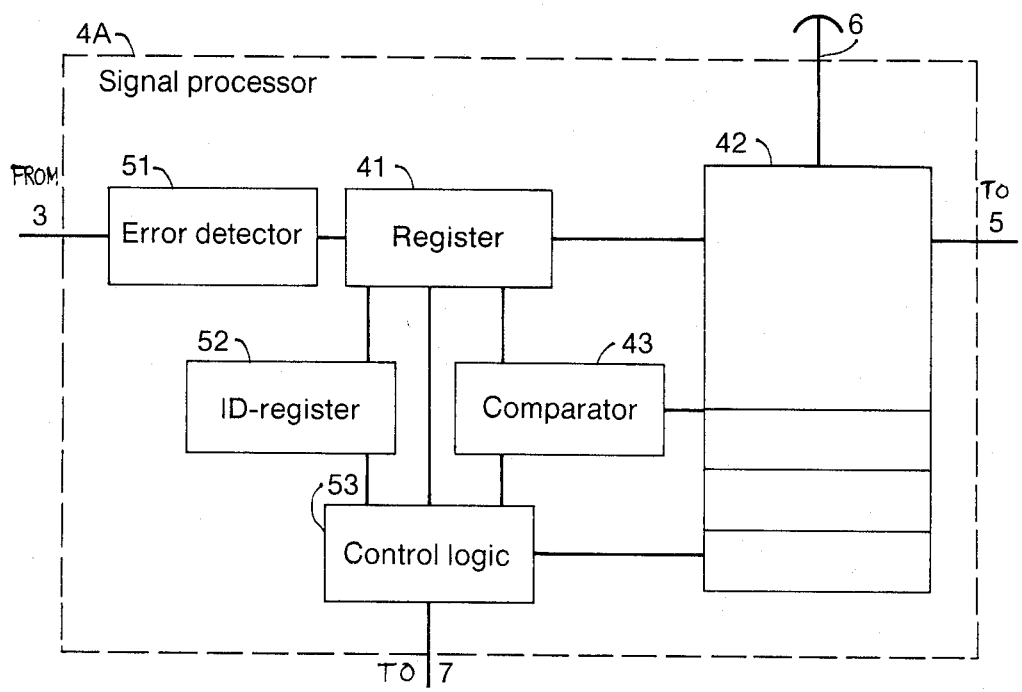
FIG. 3 is a block diagram of a variant of the signal processor.

An alternative signal processor 4A for carrying out the developed methods in accordance with the invention is, as illustrated in FIG. 3, provided with a register 41, a message memory 42 and a comparator 43 of the previously described arrangement. The signal processor 4A is further provided with an error detector 51 coupled between the decoder 3 and the register 41, an ID register connected to the register 41 and adapted for storing identity codes for all the messages stored in the register 41 and the message memory 42, in the case where these are provided with identity codes in the form of a character combination.

A control logic 53 of another kind is connected to the register 41, the message memory 42, comparator 43 and ID register 52 and is adapted to receive signals from the register and the ID register concerning received messages, and on the basis of these signals to give control signals to the register 41, the message memory 42 and the comparator 43 concerning the comparison between the messages and the transfer of these from the register to the message memory, in the cases where transfer is to be permitted. The control logic 53 is also adapted to control sending an alarm signal from the alarm sender 7.

Both the radio part in the receiver and the described logic circuits are made from integrated and are known in the prior art thus, they do not require any closer description. All the described components are accommodated in a small, easily wearable apparatus which is suitable for use as a personnel locator.

I claim:

1. A method comprising transmitting messages in the form of coded characters, including in the messages respective identity codes, receiving the messages and detecting the characters therein, storing the first received message in a message memory provided with room for more than one message, and comparing the identity code of the first received stored message in the message memory with the identity codes of later received messages, and ignoring any later received message having the same identity code as a message previously stored.

2. A method as claimed in claim 1, in which there is included the steps of storing the characters of the message in blocks, further comprising the additional steps of comparing a selected number of blocks, which is less than all the blocks of the message and at least one block, from the last received message with corresponding blocks from the message or messages already received, whereby the selected blocks constitute the identity code.

3. A method as claimed in claim 2, comprising checking, on the basis of control characters inserted in each of the blocks, whether any block contains any incorrectly received character, and when there is an incorrectly received character, storing an error indication together with the error containing block and confining the comparing to error-free blocks.

4. A method as claimed in claim 1 comprising reading the identity code in the form of a character combination inserted in the associated message.

5. A receiver adapted for receiving messages characterized by an address and in the form of coded characters including respective identity codes comprising a receiver aerial (1), radio means (2) for receiving radio signals and provided with a demodulator for feeding out received characters, a decoder (3) connected to the radio means and adpated for detecting the receiver's address in the received characters, and a signal processor (4, 4A) connected to the decoder (3) and including a message memory (42) with space for more than one message, the signal processor (4, 4A) including a register (41) for storing messages received from the decoder, and a comparator (43) adapted for comparing an identity code in a message in the register (41) with the identity codes in the messages in the message memory (42), and on agreement to store information thereon, and on conformity between the identity codes preventing storage in the message memory (42) of the message in the register (41).

6. A receiver as claimed in claim 5, in which the message memory (42) and register (41) are adapted for storing the messages in blocks, further comprising a control logic means (44, 53) for comparing, in coaction with the comparator (43), a selected number of blocks from the register (41) with corresponding blocks from the message or messages stored in the message memory (42).

7. A receiver as claimed in claim 6 further comprising, an error detector (51) connected to the decoder (3) and adapted for detecting errors in the characters of the block on the basis of control characters included in the block, the register (41) and message memory (42) also being adapted for storing, together with the block, an indication relating to errors in the block, the control logic (53) and comparator (43) also being adapted to confine the comparison to error-free blocks.

8. A receiver as claimed in claim 5, further comprising an identity register (52) adapted for storing an identity code in the form of a character combination from each of the messages stored in the register (41) and message memory (42).

* * * * *